(12) United States Patent
Baker et al.

(10) Patent No.: US 9,212,473 B2
(45) Date of Patent: Dec. 15, 2015

(54) ELECTRONIC PLUMBING FIXTURE FITTING

(71) Applicants: Daniel W. Baker, Medina, OH (US); Harshil R. Parikh, North Olmsted, OH (US); Inho Song, Chesterland, OH (US)

(72) Inventors: Daniel W. Baker, Medina, OH (US); Harshil R. Parikh, North Olmsted, OH (US); Inho Song, Chesterland, OH (US)

(73) Assignee: Moen Incorporated, North Olmsted, OH (US)

(*) Notice: Subject to any disclaimer, the term of this patent is extended or adjusted under 35 U.S.C. 154(b) by 262 days.

(21) Appl. No.: 13/889,186

(22) Filed: May 7, 2013

(65) Prior Publication Data

US 2013/0291978 A1   Nov. 7, 2013

Related U.S. Application Data

(60) Provisional application No. 61/643,442, filed on May 7, 2012.

(51) Int. Cl.
| | |
|---|---|
| *E03C 1/05* | (2006.01) |
| *E03C 1/04* | (2006.01) |
| *F16K 11/00* | (2006.01) |
| *F16K 31/02* | (2006.01) |

(52) U.S. Cl.
CPC . *E03C 1/04* (2013.01); *E03C 1/055* (2013.01); *F16K 19/006* (2013.01); *F16K 31/02* (2013.01); *Y10T 137/9464* (2015.04)

(58) Field of Classification Search
CPC ....... F16K 19/006; F16K 31/02; F16K 31/05; E03C 1/055; E03C 1/057; Y10T 137/9464
USPC ............. 137/801; 251/129.03, 129.04; 4/623
See application file for complete search history.

(56) References Cited

U.S. PATENT DOCUMENTS

| | | | |
|---|---|---|---|
| 3,612,882 | A | 10/1971 | Sheppard |
| 4,445,541 | A | 5/1984 | Schmiel |
| 4,681,563 | A | 7/1987 | Deckert et al. |
| 4,854,498 | A | 8/1989 | Stayton |
| 5,065,146 | A | 11/1991 | Garrett |
| 5,293,900 | A | 3/1994 | Karbassi et al. |
| 5,551,598 | A | 9/1996 | Cutsinger |
| 5,675,359 | A | 10/1997 | Anderson |
| 5,694,153 | A | 12/1997 | Aoyagi et al. |
| 5,724,068 | A | 3/1998 | Sanchez et al. |
| 5,868,311 | A * | 2/1999 | Cretu-Petra ................ 236/12.12 |
| 6,341,389 | B2 * | 1/2002 | Philipps-Liebich et al. ....... 4/623 |
| 6,513,787 | B1 * | 2/2003 | Jeromson et al. ........ 251/129.04 |
| 7,152,469 | B2 | 12/2006 | Milleker et al. |
| 7,743,788 | B2 | 6/2010 | Schmitt et al. |
| 7,886,766 | B2 | 2/2011 | Radomsky et al. |
| 8,063,881 | B2 | 11/2011 | Wright |
| 8,820,705 | B2 | 9/2014 | Davidson et al. |
| 2005/0162389 | A1 * | 7/2005 | Obermeyer et al. .......... 345/161 |
| 2007/0035516 | A1 | 2/2007 | Voto et al. |
| 2008/0164331 | A1 | 7/2008 | Schmitt |
| 2011/0114187 | A1 | 5/2011 | Sawaski |

OTHER PUBLICATIONS

International Search Report for International App. No. PCT/US2013/039975 dated Sep. 5, 2013 (3 pages).
Written Opinion of the International Searching Authority for International App. No. PCT/US2013/039975 dated Sep. 5, 2013 (9 pages).

* cited by examiner

*Primary Examiner* — Matthew W Jellett
(74) *Attorney, Agent, or Firm* — Calfee, Halter & Griswold LLP (57) ABSTRACT

The present invention provides an electronic plumbing fixture fitting, such as an electronic faucet.

17 Claims, 5 Drawing Sheets

ELECTRONIC PLUMBING FIXTURE FITTING

CROSS-REFERENCE TO RELATED APPLICATION

This application claims the benefit of U.S. Provisional Application No. 61/643,442, filed May 7, 2012, the entire disclosure of which is hereby incorporated by reference.

FIELD

The present invention relates generally to an electronic plumbing fixture fitting, such as an electronic faucet.

BACKGROUND

Electronic plumbing fixture fittings, such as electronic faucets, are well known. Such electronic plumbing fixture fittings are used in residential and commercial applications, such as in kitchens, bathrooms, and various other locations.

Electronic plumbing fixture fittings have many different activation and actuation mechanisms. As a result, the user may be confused as to how to activate or actuate the electronic plumbing fixture fitting.

SUMMARY

The present invention provides an electronic plumbing fixture fitting. In an exemplary embodiment, the electronic plumbing fixture fitting comprises a discharge outlet, an electronic valve, a parameter sensor, and a user interface. The discharge outlet is operable to deliver water. The electronic valve is operable to permit flow of water through the discharge outlet when the electronic valve is activated and to prevent flow of water through the discharge outlet when the electronic valve is deactivated. The parameter sensor includes an emitter and a detector. The parameter sensor is operable to detect an intensity of energy transmitted from the emitter to the detector and provide information to set at least one parameter of water flowing through the electronic valve based on the intensity of energy detected. The user interface is operable to vary the intensity of energy transmitted from the emitter to the detector.

In another exemplary embodiment, the electronic plumbing fixture fitting comprises a discharge outlet, an electronic valve, a parameter sensor, and a mechanical user interface. The discharge outlet is operable to deliver water. The electronic valve is operable to permit flow of water through the discharge outlet when the electronic valve is activated and to prevent flow of water through the discharge outlet when the electronic valve is deactivated. The parameter sensor includes an emitter and a detector. The parameter sensor is operable to detect an intensity of energy transmitted from the emitter to the detector and provide information to set at least one parameter of water flowing through the electronic valve based on the intensity of energy detected. The mechanical user interface is operable to move in at least one direction. Movement of the mechanical user interface in the at least one direction varies the intensity of energy transmitted from the emitter to the detector.

In a further exemplary embodiment, the electronic plumbing fixture fitting comprises a discharge outlet, an electronic valve, a mechanical flow device, a mechanical actuation device, and a parameter sensor. The discharge outlet is operable to deliver water. The electronic valve is operable to permit flow of water through the discharge outlet when the electronic valve is activated and to prevent flow of water through the discharge outlet when the electronic valve is deactivated. The mechanical flow device is operable to permit transmission of varying intensities of energy through the mechanical flow device based on the position of the mechanical flow device. The mechanical actuation device is operable to change the position of the mechanical flow device. The parameter sensor is operable to detect the intensity of energy transmitted through the mechanical flow device and provide information to set at least one of a temperature and a volume of water flowing through the electronic flow device based on the intensity of energy detected.

BRIEF DESCRIPTION OF THE DRAWINGS

FIGS. 5a and 5b are views of a parameter sensor of the electronic faucet of FIG. 2

DETAILED DESCRIPTION

The present invention provides an electronic plumbing fixture fitting. In an exemplary embodiment, the electronic plumbing fixture fitting is an electronic faucet. However, one of ordinary skill in the art will appreciate that the electronic plumbing fixture fitting could be an electronic showerhead, an electronic handheld shower, an electronic body spray, an electronic side spray, or any other electronic plumbing fixture fitting.

Figure 1:
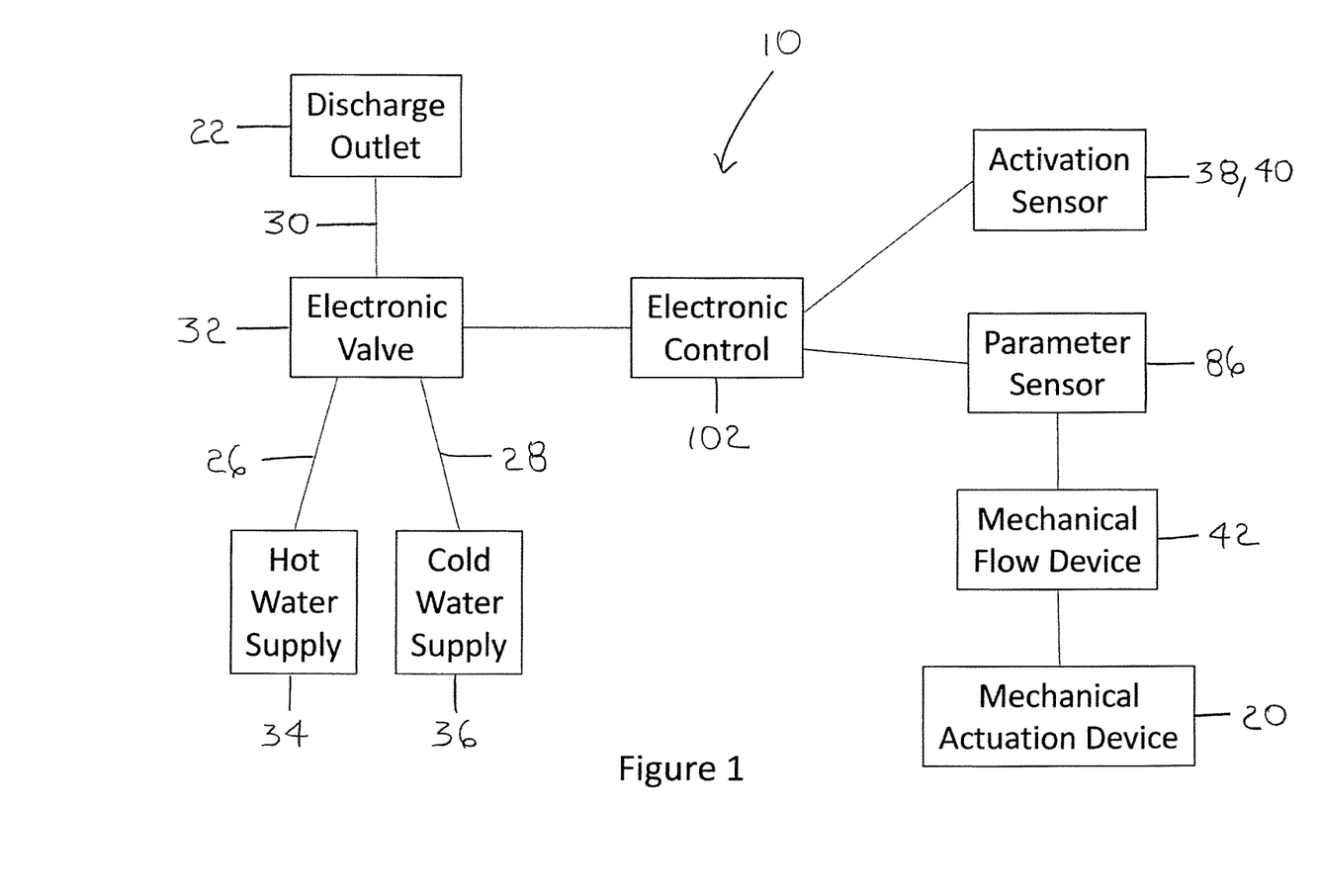
FIG. 1 is a schematic illustration of an electronic plumbing fixture fitting according to an exemplary embodiment of the present invention.

An exemplary embodiment of an electronic plumbing fixture fitting 10, such as an electronic faucet 12, is illustrated in FIG. 1. An exemplary embodiment of the electronic faucet 12 is illustrated in FIGS. 2-5b.

Figure 2:
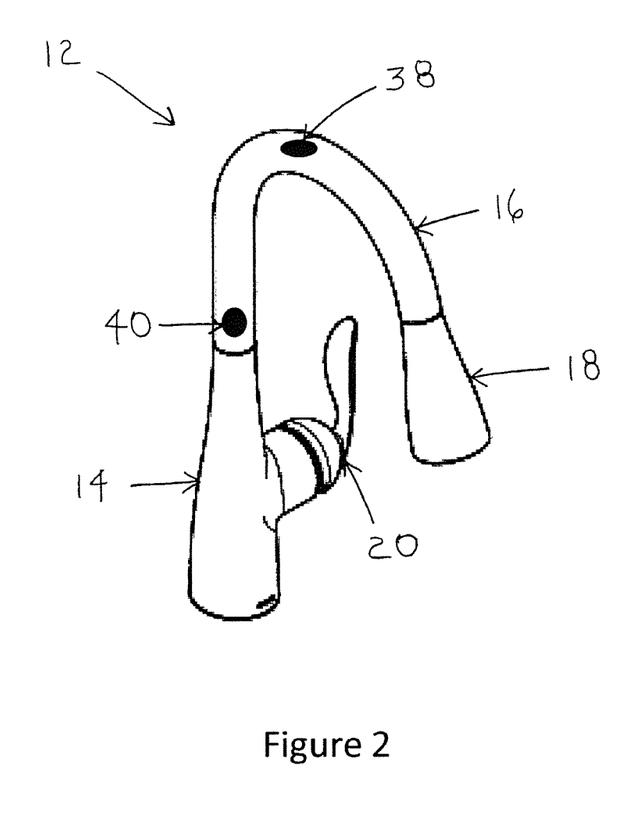
FIG. 2 is a perspective view of an electronic faucet according to an exemplary embodiment of the present invention.

In the illustrated embodiments, as best shown in FIG. 2, the faucet 12 includes a hub 14, a spout 16, a flexible hose (not shown), a wand 18, and a handle 20. An upstream end of the hub 14 is connected to a mounting surface (such as a counter or sink). An upstream end of the spout 16 is connected to a downstream end of the hub 14. The spout 16 is operable to rotate relative to the hub 14. The flexible hose extends through the hub 14 and the spout 16 and is operable to move within the hub 14 and the spout 16. An upstream end of the wand 18 is mounted in a downstream end of the spout 16 and is connected to a downstream end of the flexible hose. A downstream end of the wand 18 includes a discharge outlet 22 through which water is delivered from the faucet 12. The wand 18 is operable to be pulled away from the spout 16. The handle 20 covers a side opening 24 in the hub 14 and is operable to be moved relative to the hub 14. Although the faucet 12 has been described as having a rotatable spout 16, a pull-out or pull-down wand 18, and a handle 20 mounted on the hub 14, one of ordinary skill in the art will appreciate that the spout 16 could be fixed relative to the hub 14, the faucet 12 may not include a wand 18, the handle 20 may be mounted on other locations on the faucet 12 or remote from the faucet 12, the faucet could include more than one handle 20, and/or the handle 20 may be any mechanical actuation device or user interface.

Additionally, in the illustrated embodiments, as best shown in FIG. 1, the fitting 10 includes a hot water line 26, a cold water line 28, a mixed water line 30, and an electronic valve 32. An upstream end of the hot water line 26 connects to a hot water supply 34, and an upstream end of the cold water line 28 connects to a cold water supply 36. A downstream end of the hot water line 26 connects to the electronic valve 32, and a downstream end of the cold water line 28 connects to the electronic valve 32. An upstream end of the mixed water line 30 connects to the electronic valve 32. A downstream end of the mixed water line 30 connects to the discharge outlet 22. In the illustrated embodiments, at least a portion of the mixed water line 30 is the flexible hose. As stated above, the downstream end of the flexible hose connects to the upstream end of the wand 18. Although the faucet 12 has been described as including an electronic valve 32, one of ordinary skill in the art will appreciate that the faucet 12 could include more than one electronic valve and/or the faucet could include one or more mechanical valves in series or in parallel with the electronic valve(s).

In an exemplary embodiment, the electronic valve 32 is a throttling valve. However, one of ordinary skill in the art will appreciate that the electronic valve 32 could be any type of electronic valve, including, but not limited to, an electronic mixing valve, a stepper motor actuated valve, and a solenoid valve.

Further, in the illustrated embodiments, as best shown in FIGS. 1 and 2, the fitting 10 includes an activation sensor, such as a toggle sensor 38 and a presence sensor 40 of the faucet 12.

In an exemplary embodiment, the toggle sensor 38 is a proximity sensor and, in particular, an infrared sensor. The toggle sensor 38 is also referred to as a latching sensor and a sustained-flow sensor. In the illustrated embodiments, the toggle sensor 38 is mounted on an apex of the spout 16. The toggle sensor 38 defines a toggle zone. In an exemplary embodiment, the toggle sensor 38 is operable to activate the electronic valve 32 when an object enters the toggle zone and to deactivate the electronic valve 32 when the object exits and reenters the toggle zone. As used herein, an "object" can be any portion of a user's body or any item used by the user to trigger the toggle sensor 38. In an exemplary embodiment, the toggle zone extends generally upwardly from the toggle sensor 38. Additionally, in an exemplary embodiment, the toggle zone has a generally cone-like shape.

In an exemplary embodiment, the presence sensor 40 is a proximity sensor, and, in particular, an infrared sensor. The presence sensor 40 is also referred to as a quick-strike sensor. In the illustrated embodiments, the presence sensor 40 is mounted on the upstream end of the spout 16. The presence sensor 40 defines a presence zone. In an exemplary embodiment, the presence sensor 40 is operable to activate the electronic valve 32 when an object enters the presence zone and to deactivate the electronic valve 32 when the object exits the presence zone. Again, as used herein, an "object" can be any portion of a user's body or any item used by the user to trigger the presence sensor 40. In an exemplary embodiment, the presence zone extends generally horizontally from the presence sensor 40. Additionally, in an exemplary embodiment, the presence zone has a generally cone-like shape.

As described above, the toggle sensor 38 and the presence sensor 40 are proximity sensors and, in particular, infrared sensors. Proximity sensors are sensors that detect the presence of an object without any physical contact. However, one of ordinary skill in the art will appreciate that the toggle sensor 38 and the presence sensor 40 could be any type of electronic sensors that can be triggered, including, but not limited to, other proximity sensors, touch sensors, and image sensors. Exemplary electronic sensors include, but are not limited to, electromagnetic radiation sensors (such as optical sensors and radar sensors), capacitance sensors, inductance sensors, piezo-electric sensors, and multi-pixel optical sensors (such as camera sensors). Moreover, the toggle sensor 38 and the presence sensor 40 may not be the same type of sensor. As further described above, the toggle sensor 38 is mounted on the apex of the spout 16 and the presence sensor 40 is mounted on the upstream end of the spout 16. However, one of ordinary skill in the art will appreciate that the toggle sensor 38 and the presence sensor 40 could be mounted in any location on the faucet 12 or in a location remote from the faucet 12. Furthermore, the toggle sensor 38 and the presence sensor 40 may be located in close proximity to each other or fairly remote from each other.

Similarly, as described above, the sensors are a toggle sensor 38 and a presence sensor 40. However, one of ordinary skill in the art will appreciate that the toggle sensor 38 and the presence sensor 40 could be any type of sensors that provide information useful in determining whether to activate or deactivate the electronic valve 32, including, but not limited to, flow sensors, pressure sensors, temperature sensors, and position sensors. Moreover, the toggle sensor 38 and the presence sensor 40 may be the same type of sensor.

Figure 3:
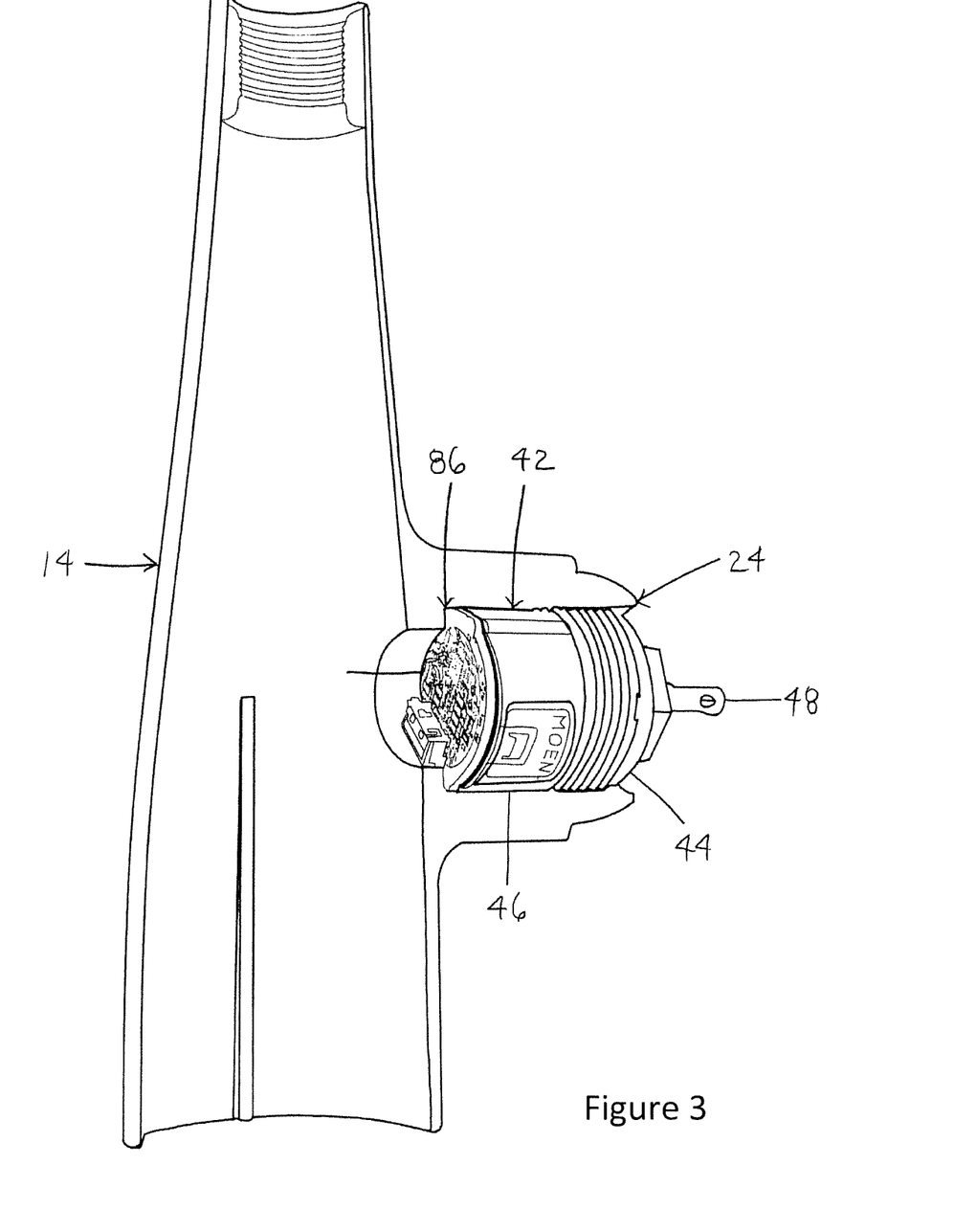
FIG. 3 is a perspective view of certain components of the electronic faucet of FIG. 2, with a hub of the faucet in cross-section.
Figure 4:
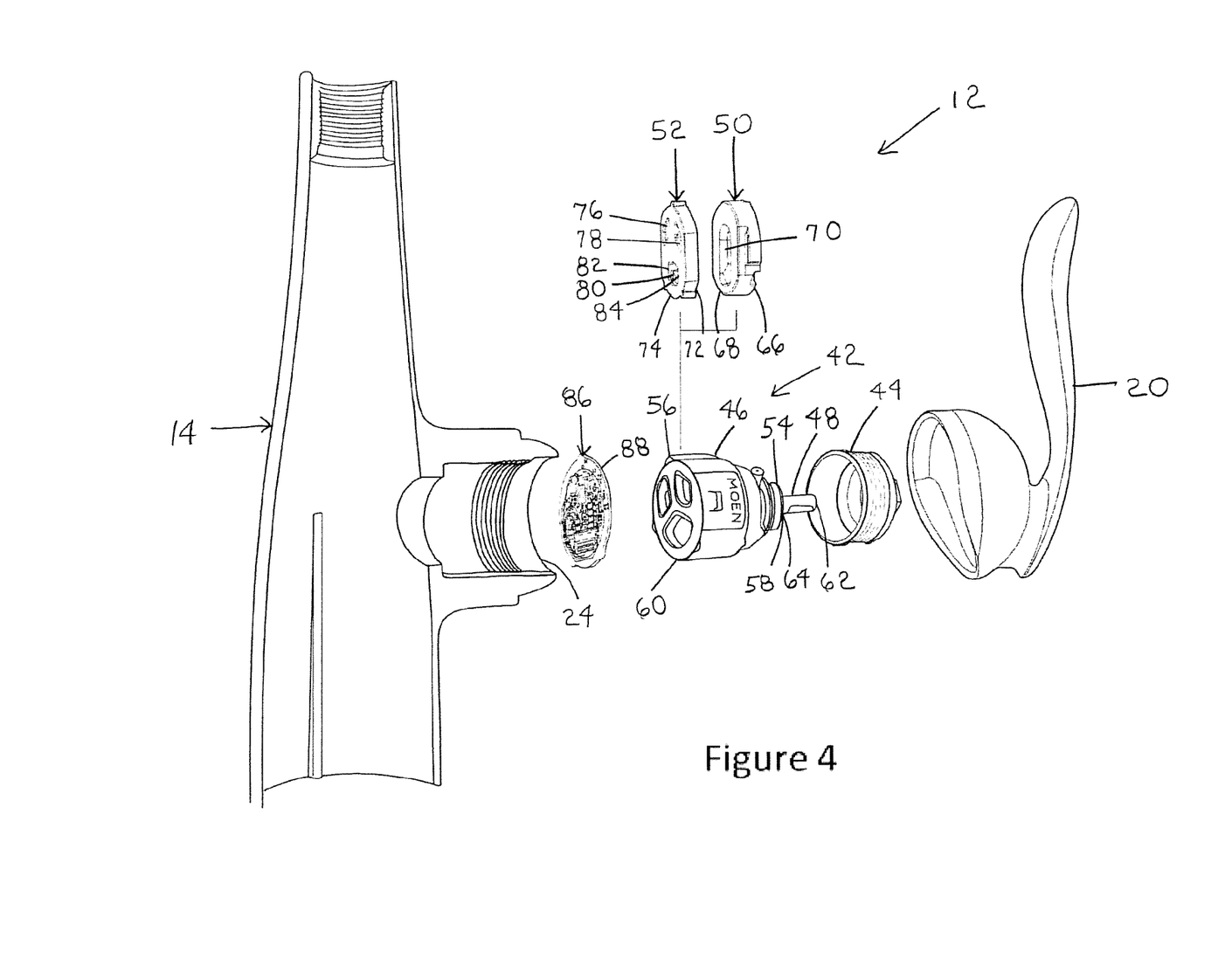
FIG. 4 is an exploded perspective view of certain components of the electronic faucet of FIG. 2, with the hub of the faucet in cross-section.

Additionally, in the illustrated embodiments, as best shown in FIGS. 1, 3, and 4, the fitting 10 includes a mechanical flow device 42. The mechanical flow device 42 is not connected to the hot water line 26, the cold water line 28, or the mixed water line 30. A nut 44 maintains the mechanical flow device 42 in the side opening 24 in the hub 14. The handle 20 or other mechanical actuation device or user interface controls the mechanical flow device 42.

In the illustrated embodiments, the mechanical flow device 42 includes a housing 46, a stem 48, a moveable disk 50, and a fixed disk 52. Mechanical flow devices of this type are commonly referred to as mechanical valves or cartridge assemblies. The mechanical valve or cartridge assembly in the illustrated embodiments is for a one handle faucet. Mechanical valves and cartridge assemblies are well-known in the art and, therefore, only the relevant components of the mechanical valve or cartridge assembly will be described in greater detail.

In the illustrated embodiments, the housing 46 includes a first end 54 and a second end 56. The housing 46 includes an opening 58 in the first end 54 and an opening 60 in the second end 56. In an exemplary embodiment, the housing 46 is formed of plastic. However, the housing 46 could be formed of other suitable materials, such as metal.

In the illustrated embodiments, the stem 48 includes a first end 62 and a second end 64 (only partially shown). The stem 48 extends through the opening 58 in the first end 54 of the housing 46. In an exemplary embodiment, the stem 48 is formed of metal. However, the stem 48 could be formed of other suitable materials, such as plastic.

In the illustrated embodiments, the moveable disk 50 includes a first side 66 and a second side 68. Additionally, the moveable disk 50 includes a cavity 70 in the second side 68. In an exemplary embodiment, the moveable disk 50 is formed of ceramic material. However, the moveable disk 50 could be formed of other suitable materials, such as plastic or metal.

In the illustrated embodiments, the fixed disk 52 includes a first side 72 and a second side 74. Additionally, the fixed disk 52 includes a first inlet 76, a second inlet 78, and an outlet 80 extending from the first side 72 through the second side 74. The outlet 80 includes a first side 82 and a second side 84. In an exemplary embodiment, the fixed disk 52 is formed of ceramic material. However, the fixed disk 52 could be formed of other suitable materials, such as plastic or metal.

In the illustrated embodiments, the handle 20 is connected to the first end 62 of the stem 48, and the second end 64 of the stem 48 is connected to the first side 66 of the moveable disk 50 (either directly or indirectly). Additionally, the second side 68 of the moveable disk 50 abuts the first side 72 of the fixed disk 52. Movement of the handle 20 causes movement of the stem 48. Movement of the stem 48 causes movement of the moveable disk 50 relative to the fixed disk 52.

Further, in the illustrated embodiments, as best shown in FIGS. 1, 3, 4, 5*a*, and 5*b*, the fitting 10 includes a parameter sensor 86. The parameter sensor 86 includes a printed circuit board 88. The printed circuit board 88 includes a first side 90 and a second side 92. The first side 90 of the printed circuit board 88 faces the second side 74 of the fixed disk 52.

Figure 5A:
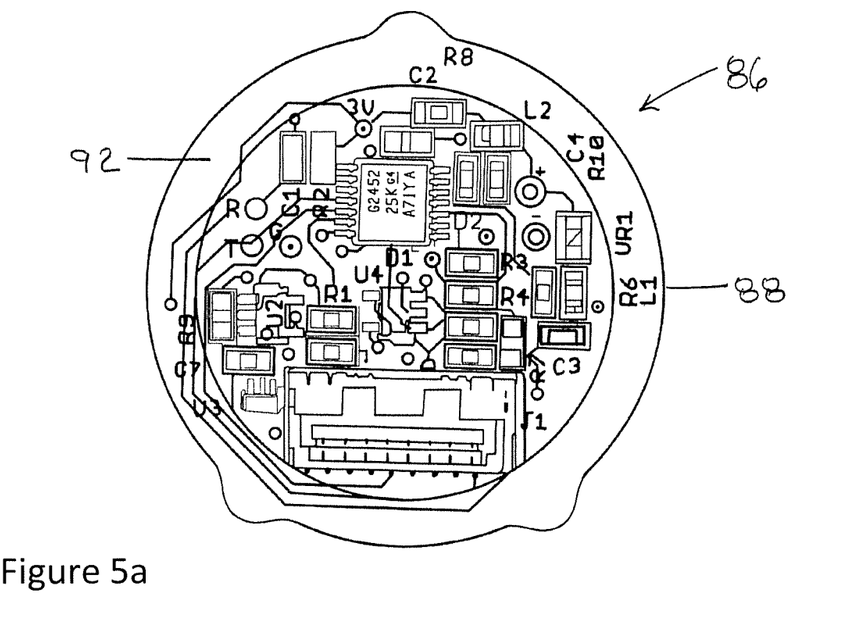
-FIG. 5a is a plan view of a first side and FIG. 5b is a plan view of a second side.
Figure 5B:
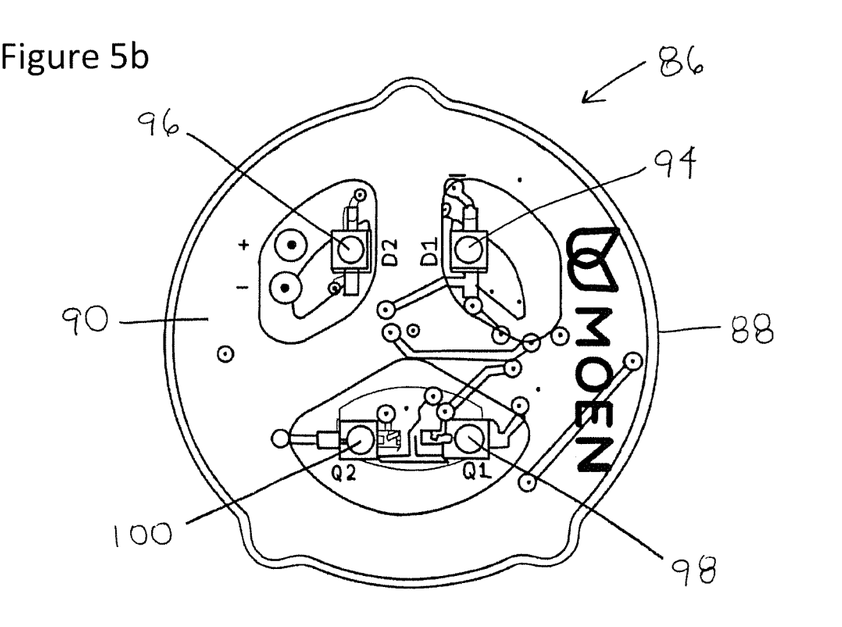

In the illustrated embodiments, the parameter sensor 86 includes a first emitter 94, a second emitter 96, a first detector 98, and a second detector 100 mounted on the first side 90 of the printed circuit board 88. When the printed circuit board 88 faces the second side 74 of the fixed disk 52, the first emitter 94 is mounted in the first inlet 76 of the fixed disk 52, the second emitter 96 is mounted in the second inlet 78 of the fixed disk 52, the first detector 98 is mounted in the first side 82 of the outlet 80 in the fixed disk 52, and the second detector 100 is mounted in the second side 84 of the outlet 80 in the fixed disk 52.

In an exemplary embodiment, the first emitter 94 and the second emitter 96 emit infrared light, and the first detector 98 and the second detector 100 detect the infrared light. However, one of ordinary skill in the art will appreciate that the first emitter 94 and the second emitter 96 could emit any type of energy, including, but not limited to, visible light, acoustic energy (both ultrasonic and audible), and compressed air. Moreover, one of ordinary skill in the art will appreciate that the first detector 98 and the second detector 100 would detect whatever type of energy is emitted from the first emitter 94 and the second emitter 96.

In an exemplary embodiment, when the first emitter 94 is activated, energy is emitted through the first inlet 76 in the fixed disk 52, through the cavity 70 in the moveable disk 50, and to the outlet 80 in the fixed disk 52 where it can be detected by the first detector 98 and the second detector 100. Similarly, when the second emitter 96 is activated, energy is emitted through the second inlet 78 in the fixed disk 52, through the cavity 70 in the moveable disk 50, and to the outlet 80 in the fixed disk 52 where it can be detected by the first detector 98 and the second detector 100.

In an exemplary embodiment, the parameter sensor 86 is operable to detect an intensity of energy transmitted from the first emitter 94 and the second emitter 96 to the first detector 98 and the second detector 100 and to provide information to set at least one parameter of water flowing through the electronic valve 32 based on the intensity of energy detected. In an exemplary embodiment, based on the intensity of energy transmitted from the first emitter 94 and the second emitter 96 to the first detector 98 and the second detector 100, the parameter sensor 86 provides information to set a temperature and/ or a volume of water flowing through the electronic valve 32.

In the illustrated embodiments, the handle 20 operates as it would with a standard faucet. In other words, the handle 20 can be moved between various positions to indicate a desired temperature and volume of water discharged from the faucet 12.

More specifically, with regard to the temperature of water, the handle 20 can be rotated about a longitudinal axis of the side opening 24 in the hub 14. At one extent of the range of rotation, the position of the handle 20 indicates all hot water (a full hot position). At the other extent of the range of rotation, the position of the handle 20 indicates all cold water (a full cold position). In between the extents of the range of rotation, the position of the handle 20 indicates a mix of hot and cold water (mixed temperature positions) with hotter temperature water as the position nears the full hot extent of the range of rotation and colder temperature water as the position nears the full cold extent of the range of rotation.

With regard to the volume of water, the handle 20 can be moved toward and away from the side opening 24 in the hub 14. At one extent of the range of movement, the position of the handle 20 indicates no volume of water (a full closed position). At the other extent of the range of movement, the position of the handle 20 indicates full volume of water (a full open position). In between the extents of the range of movement, the position of the handle 20 indicates an intermediate volume of water (less than full open positions) with reduced volume water as the position nears the full closed extent of the range of movement and increased volume water as the position nears the full open extent of the range of movement.

Similarly, in the illustrated embodiments, the moveable disk 50 and the fixed disk 52 operate as they would with a standard faucet, except that energy is transmitted through the disks instead of water flowing through the disks. In other words, the moveable disk 50 can be moved between various positions corresponding to the various positions of the handle 20. Depending on the position of the handle 20, the first inlet 76 and the second inlet 78 in the fixed disk 52 have varying degrees of openness relative to the outlet 80 in the fixed disk 52 via the cavity 70 in the moveable disk 50. Based on the degree of openness of the first inlet 76 and the second inlet 78 relative to the outlet 80, varying intensities of energy are transmitted from the first emitter 94 and the second emitter 96 of the parameter sensor 86 to the first detector 98 and the second detector 100 of the parameter sensor 86.

More specifically, with regard to the temperature of water, in the full hot position, the cavity 70 in the moveable disk 50 permits transmission of energy from only the first inlet 76 in the fixed disk 52 (corresponding to hot) to the outlet 80 in the fixed disk 52. In the full cold position, the cavity 70 in the moveable disk 50 permits transmission of energy from only the second inlet 78 in the fixed disk 52 (corresponding to cold) to the outlet 80 in the moveable disk 50. In the mixed temperature positions, the cavity 70 in the moveable disk 50 permits transmission of energy from both the first inlet 76 in the fixed disk 52 (corresponding to hot) and the second inlet 78 in the fixed disk 52 (corresponding to cold) to the outlet 80 in the fixed disk 52.

With regard to the volume of water, in the closed position, the cavity 70 in the moveable disk 50 does not permit any transmission of energy from the first inlet 76 in the fixed disk 52 and the second inlet 78 in the fixed disk 52 to the outlet 80 in the fixed disk 52. In the full open position, the cavity 70 in the moveable disk 50 permits full transmission of energy from the first inlet 76 in the fixed disk 52 and the second inlet 78 in the fixed disk 52 to the outlet 80 in the fixed disk. In the less than full open positions, the cavity 70 in the moveable disk 50 permits partial transmission of energy from the first inlet 76 in the fixed disk 52 and the second inlet 78 in the fixed disk 52 to the outlet 80 in the fixed disk 52.

As described above, movement of the handle 20, whether by rotation about the longitudinal axis of the side opening 24 in the hub 14 or movement toward or away from the side opening 24 in the hub 14, causes movement of the moveable disk 50 relative to the fixed disk 52. Further, movement of the moveable disk 50 relative to the fixed disk 52 causes movement of the cavity 70 in the moveable disk 50 relative to the first inlet 76, the second inlet 78, and the outlet 80 in the fixed disk 52. As a result, varying intensities of energy are transmitted from the first emitter 94 and the second emitter 96 to the first detector 98 and the second detector 100 based on the position of the handle 20.

Similarly, as described above, in the full hot position, the cavity 70 in the moveable disk 50 permits transmission of energy from only the first inlet 76 in the fixed disk 52 to the outlet 80 in the fixed disk 52, in the full cold position, the cavity 70 in the moveable disk 50 permits transmission of energy from only the second inlet 78 in the fixed disk 52 to the outlet 80 in the fixed disk 52, and in the full closed position, the cavity 70 in the moveable disk 50 does not permit any transmission of energy from the first inlet 76 in the fixed disk 52 and the second inlet 78 in the fixed disk 52 to the outlet 80 in the fixed disk 52. If the moveable disk 50 and the fixed disk 52 are opaque, the operation of the mechanical flow device 42 is as described above. In other words, when the fixed disk 50 and the moveable disk 52 are opaque and one of the inlets is closed (i.e., in the full hot position, in the full cold position, or in the full closed position), there is no transmission of energy from the inlet that is closed to the outlet. However, if the moveable disk 50 and the fixed disk 52 are translucent, the operation of the mechanical flow device 42 has an additional aspect that is described below.

When the fixed disk 50 and the moveable disk 52 are translucent and one of the inlets is closed (i.e., in the full hot position, in the full cold position, or in the full closed position), there is some transmission of energy from the inlet that is closed to the outlet. More specifically, when the moveable disk 50 and the fixed disk 52 are translucent, energy is transmitted through the moveable disk 50 and the fixed disk 52 themselves (as opposed to through the cavity 70 in the moveable disk 50). Therefore, even when the handle 20 is in the full hot position, the full cold position, or the full closed position, the moveable disk 50 and the fixed disk 52 permit some transmission of energy from both the first inlet 76 in the fixed disk 52 and the second inlet 78 in the fixed disk 52 to the outlet 80 in the fixed disk 52. The intensity of energy transmitted through the inlet that is closed will be low (especially compared to the intensity of energy transmitted through the inlet that is open). As a result, when the fixed disk 50 and the moveable disk 52 are translucent and the handle 20 is in the full closed position, the handle 20 can still be used to indicate the desired temperature of water discharged from the faucet 12 (for use when the electronic valve 32 is being activated and deactivated by the toggle sensor 38 and/or the presence sensor 40).

In the illustrated embodiments, the mechanical flow device 42 has two inlets (i.e., the first inlet 76 and the second inlet 78 in the fixed disk 52) and a single outlet (i.e., the outlet 80 in the fixed disk 52), and the parameter sensor 86 has two emitters (i.e., the first emitter 94 and the second emitter 96) and two detectors (i.e., the first detector 98 and the second detector 100). Since the emitters in the inlets are both emitting energy toward the detectors in the same outlet, when the detectors detect energy, they are not able to determine from which emitter the detected energy was transmitted. As a result, action should be taken to enable the detectors to determine from which emitter the detected energy was transmitted. In an exemplary embodiment, the energy emitted from the emitters is the same and is sequenced so that only one emitter is emitting energy at a given time. When the emission of energy from the emitters is sequenced, the detectors are able to determine from which emitter the detected energy was transmitted. In another exemplary embodiment, the energy emitted from the emitters is different so that each emitter is emitting a different type of energy. For example, if the energy being emitted is light (infrared or visible), a different wavelength light can be emitted from each emitter. When the emission of energy from the emitters is different, the detectors are able to determine from which emitter the detected energy was transmitted.

The mechanical flow device 42 has been described as including a housing 46, a stem 48, a moveable disk 50, and a fixed disk 52. Further, the moveable disk 50 has been described as having two inlets and an outlet, and the fixed disk 52 has been described as having a cavity. Moreover, the parameter sensor has been described as having two emitters and two detectors. However, one of ordinary skill in the art will appreciate that the mechanical flow device 42 and the parameter sensor 86 could include any structure or components that are operable to permit transmission of varying intensities of energy through the mechanical flow device 42 based on the position of the handle 20.

In exemplary embodiments, the moveable disk 50 could include the inlets and the outlet and the fixed disk could include the cavity; one disk could include an inlet, the other disk could include an outlet, and neither disk could include a cavity (such as in a mechanical valve or cartridge assembly for a two handle faucet); the emitters could be mounted in the outlet and the detectors could be mounted in the inlets; the moveable disk 50 and the fixed disk 52 could include any number of inlets, outlets, and cavities, including no inlets, outlets, or cavities; and the parameter sensor 86 could include any number of emitters and detectors.

In other exemplary embodiments, the mechanical flow device 42 could include non-disk structure that permits the transmission of varying intensities of energy; and the mechanical flow device 42 could include transparent structure, without any inlets, outlets or cavities. In the transparent structure embodiment, at least one emitter and at least one detector of the parameter sensor 86 could be placed relative to reflective material in the mechanical flow device 42 such that movement of the handle 20 varies the intensity of energy transmitted from the at least one emitter to the at least one detector of the parameter sensor 86.

Although the fitting 10 has been described as including a mechanical flow device 42, one of ordinary skill in the art will appreciate that the fitting 10 may not include a mechanical flow device 42. In the embodiment without a mechanical flow device 42, the handle 20 or other user interface could be used to directly vary the intensity of energy transmitted from an emitter to a detector of the parameter sensor 86.

Additionally, in the illustrated embodiments, as best shown in FIG. 1, the fitting 10 includes an electronic control 102. The electronic control 102 receives information (such as signals) from the toggle sensor 38 and the presence sensor 40 to activate and deactivate the electronic valve 32. Moreover, the electronic control 102 receives information (such as signals) from the parameter sensor 86 to set parameters (such as the temperature and the volume) of water flowing through the electronic valve 32. Although the fitting 10 has been described as having a separate electronic control 102, one of ordinary skill in the art will appreciate that the electronic control 102 could be incorporated into the toggle sensor 38, the presence sensor 40, and/or the parameter sensor 86.

In an exemplary embodiment, the faucet 12 has a first mode in which the faucet 12 is controlled both electronically and mechanically. In the first mode, the handle 20 is in the full closed position. During operation in the first mode, the user can activate and deactivate the electronic valve 32 using the toggle sensor 38 and the presence sensor 40 as described above. Moreover, the user can control the temperature of water flowing through the electronic valve 32 by rotating the handle 20 about the longitudinal axis of the side opening 24 in the hub 14. The temperature of water flowing through the electronic valve 32 may have a preset limit, regardless of the position of the handle 20. However, the user cannot control the volume of water flowing through the electronic valve 32. The volume of water flowing through the electronic valve 32 is at a preset volume.

In the exemplary embodiment, the faucet 12 has a second mode in which the faucet 12 is controlled only mechanically. In the second mode, the handle 20 is in any open position. During operation in the second mode, the user cannot activate and deactivate the electronic valve 32 using the toggle sensor 38 or the presence sensor 40. However, the user can control the temperature and the volume of water flowing through the electronic valve 32 by rotating the handle 20 about the longitudinal axis of the side opening 24 in the hub 14 and moving the handle 20 toward and away from the side opening 24 in the hub 14.

In an alternative exemplary embodiment, the faucet 12 has a first mode in which the faucet 12 is controlled only electronically. In the first mode, the handle 20 is in the full closed position. During operation in the first mode, the user can activate and deactivate the electronic valve 32 using the toggle sensor 38 and the presence sensor 40 as described above. However, the user cannot control the temperature or volume of water flowing through the electronic valve 32. The temperature and the volume of water flowing through the electronic valve 32 are at a preset temperature and volume.

In the alternative exemplary embodiment, the faucet 12 has a second mode in which the faucet 12 is controlled only mechanically. In the second mode, the handle 20 is in any open position. During operation in the second mode, the user cannot activate and deactivate the electronic valve 32 using the toggle sensor 38 or the presence sensor 40. However, the user can control the temperature and flow of water flowing through the electronic valve 32 by rotating the handle 20 about the longitudinal axis of the side opening 24 in the hub 14 and moving the handle 20 toward and away from the side opening 24 in the hub 14.

In another alternative exemplary embodiment, the faucet 12 has a single mode in which the faucet 12 is controlled both electronically and mechanically. If the handle 20 is in the full closed position, the faucet 12 cannot be controlled electronically or mechanically. In the single mode, the handle 20 is any open position. During operation in the single mode, the user can activate and deactivate the electronic valve 32 using the toggle sensor 38 and the presence sensor 40. Moreover, the user can control the temperature and the volume of water flowing through the electronic valve 32 by rotating the handle 20 about the longitudinal axis of the side opening 24 in the hub 14 and moving the handle 20 toward and away from the side opening 24 in the hub 14.

In an exemplary embodiment, the faucet 12 has a mode in which presets for the faucet 12 can be saved or changed. In this mode, when the handle 20 is in any given position, the user indicates that the temperature and/or the volume at the current position should be saved as a preset. The user can indicate that the current position should be saved as a preset by triggering the toggle sensor 38 and/or presence sensor 40 for a predetermined period of time, such as five seconds.

One of ordinary skill in the art will now appreciate that the present invention provides an electronic plumbing fixture fitting, such as an electronic faucet. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. An electronic plumbing fixture fitting, comprising:
   a discharge outlet operable to deliver water;
   an electronic valve, the electronic valve being operable to permit flow of water through the discharge outlet when the electronic valve is activated and not permit flow of water through the discharge outlet when the electronic valve is deactivated;
   a mechanical flow device, the mechanical flow device being operable to permit transmission of varying intensities of energy through the mechanical flow device based on the position of the mechanical flow device, the mechanical flow device including an inlet and an outlet;
   a mechanical actuation device, the mechanical actuation device being operable to change the position of the mechanical flow device; and
   a parameter sensor, the parameter sensor being operable to detect the intensity of energy transmitted through the mechanical flow device and provide information to set at least one of a temperature and a volume of water flowing through the electronic valve based on the intensity of energy detected, the parameter sensor including an emitter and a detector, the emitter is operable to be mounted in at least one of the inlet and the outlet, the detector is operable to be mounted in at least one of the inlet and the outlet;
   wherein when the emitter is activated, energy is transmitted from the emitter through the mechanical flow device to the detector.

2. The electronic plumbing fixture fitting of claim 1, wherein:
   based on the intensity of energy transmitted from the emitter to the detector, the parameter sensor provides information to set the temperature of water flowing through the electronic valve.

3. The electronic plumbing fixture fitting of claim 1, wherein:
   based on the intensity of energy transmitted from the emitter to the detector, the parameter sensor provides information to set the volume of water flowing through the electronic valve.

4. The electronic plumbing fixture fitting of claim 1, wherein:
   based on the intensity of energy emitted from the emitter that is detected by the detector, the parameter sensor determines whether the inlet is open.

5. The electronic plumbing fixture fitting of claim 1, wherein:
   based on the intensity of energy emitted from the emitter that is detected by the detector, the parameter sensor determines a degree of openness of the inlet.

6. The electronic plumbing fixture fitting of claim 1, wherein:
   the mechanical flow device includes a moveable disk and a fixed disk;
   at least one of the moveable disk and the fixed disk includes the inlet; and
   at least one of the moveable disk and the fixed disk includes the outlet.

7. The electronic plumbing fixture fitting of claim 6, wherein:
movement of the moveable disk relative to the fixed disk varies an intensity of energy that is transmitted from the emitter through the mechanical flow device to the detector.

8. The electronic plumbing fixture fitting of claim 6, wherein:
the moveable disk is operable to be moved relative to the fixed disk in a first direction and in a second direction; and
the first direction is different than the second direction.

9. The electronic plumbing fixture fitting of claim 6, wherein:
movement of the moveable disk relative to the fixed disk in the first direction controls the temperature of water flowing through the electronic valve; and
movement of the moveable disk relative to the fixed disk in the second direction controls the volume of water flowing through the electronic valve.

10. The electronic plumbing fixture fitting of claim 1, wherein:
when the parameter sensor detects that the mechanical flow device is open, the parameter sensor provides information to control the temperature and the volume of water flowing through the electronic valve.

11. The electronic plumbing fixture fitting of claim 1, wherein:
when the parameter sensor detects that the mechanical flow device is closed, the parameter sensor provides information to control the temperature of water flowing through the electronic valve.

12. The electronic plumbing fixture fitting of claim 1, further including:
an activation sensor, the activation sensor being operable to activate the electronic valve when the activation sensor is triggered;
wherein:
when the parameter sensor detects that the mechanical flow device is open:
the electronic valve is activated,
the activation sensor cannot be triggered, and
the parameter sensor provides information to control the temperature and the volume of water flowing through the electronic valve; and
when the parameter sensor detects that the mechanical flow device is closed:
the activation sensor can be triggered,
the activation sensor provides information to control the activation and deactivation of the electronic valve,
the parameter sensor provides information to control the temperature of water flowing through the electronic valve, and
the parameter sensor does not provide information to control the volume of water flowing through the electronic valve.

13. The electronic plumbing fixture fitting of claim 1, further including:
an activation sensor, the activation sensor being operable to activate the electronic valve when the activation sensor is triggered;
wherein:
when the parameter sensor detects that the mechanical flow device is open:
the electronic valve is activated,
the activation sensor cannot be triggered, and
the parameter sensor provides information to control the temperature and the volume of water flowing through the electronic valve; and
when the parameter sensor detects that the mechanical flow device is closed:
the activation sensor can be triggered,
the activation sensor provides information to control the activation and deactivation of the electronic valve, and
the parameter sensor does not provide information to control the temperature or the volume of water flowing through the electronic valve.

14. The electronic plumbing fixture fitting of claim 1, further including:
an activation sensor, the activation sensor being operable to activate the electronic valve when the activation sensor is triggered;
wherein:
when the parameter sensor detects that the mechanical flow device is open:
the activation sensor can be triggered,
the activation sensor provides information to control the activation and deactivation of the electronic valve, and
the parameter sensor provides information to control the temperature and the volume of water flowing through the electronic valve; and
when the parameter sensor detects that the mechanical flow device is closed:
the electronic valve is deactivated, and
the activation sensor cannot be triggered.

15. An electronic plumbing fixture fitting, comprising:
a discharge outlet operable to deliver water;
an electronic valve, the electronic valve being operable to permit flow of water through the discharge outlet when the electronic valve is activated and not permit flow of water through the discharge outlet when the electronic valve is deactivated;
a mechanical flow device, the mechanical flow device being operable to permit transmission of varying intensities of energy through the mechanical flow device based on the position of the mechanical flow device, the mechanical flow device including a first inlet, a second inlet, and an outlet, the outlet having a first side and a second side;
a mechanical actuation device, the mechanical actuation device being operable to change the position of the mechanical flow device; and
a parameter sensor, the parameter sensor being operable to detect the intensity of energy transmitted through the mechanical flow device and provide information to set at least one of a temperature and a volume of water flowing through the electronic valve based on the intensity of energy detected, the parameter sensor including a first emitter, a second emitter, a first detector, and a second detector, the first emitter is operable to be mounted in at least one of the first inlet, the second inlet, the first side of the outlet, and the second side of the outlet, the second emitter is operable to be mounted in at least one of the first inlet, the second inlet, the first side of the outlet, and the second side of the outlet, the first detector is operable to be mounted in at least one of the first inlet, the second inlet, the first side of the outlet, and the second side of the outlet, and the second detector is operable to be mounted in at least one of the first inlet, the second inlet, the first side of the outlet, and the second side of the outlet;

wherein, when the first emitter is activated, energy is transmitted from the first emitter through the mechanical flow device to the first detector and the second detector; and wherein, when the second emitter is activated, energy is transmitted from the second emitter through the mechanical flow device to the first detector and the second detector.

16. The electronic plumbing fixture fitting of claim 15, wherein:

the energy emitted from the first emitter is the same as the energy emitted from the second emitter; and the emission of energy from the first emitter is sequenced with the emission of energy from the second emitter.

17. The electronic plumbing fixture fitting of claim 15, wherein:

the energy emitted from the first emitter is different than the energy emitted from the second emitter.

\* \* \* \* \*